United States Patent
Muraki

(10) Patent No.: US 7,543,130 B2
(45) Date of Patent: Jun. 2, 2009

(54) DIGITAL SIGNAL PROCESSOR FOR INITIALIZING A RAM

(75) Inventor: Yasuyuki Muraki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 318 days.

(21) Appl. No.: 10/986,525

(22) Filed: Nov. 10, 2004

(65) Prior Publication Data

US 2005/0138275 A1    Jun. 23, 2005

(30) Foreign Application Priority Data

| Nov. 14, 2003 | (JP) | ............................. 2003-385234 |
| Aug. 20, 2004 | (JP) | ............................. 2004-240705 |
| Oct. 12, 2004 | (JP) | ............................. 2004-297983 |
| Nov. 8, 2004  | (JP) | ............................. 2004-323735 |

(51) Int. Cl.
G06F 12/00 (2006.01)
G06F 13/00 (2006.01)
G06F 13/28 (2006.01)
G06F 17/10 (2006.01)
G06F 3/00 (2006.01)
G11C 7/00 (2006.01)

(52) U.S. Cl. ....................... 711/200; 711/166; 711/170; 711/104; 711/106; 711/218; 708/300; 365/222; 710/10

(58) Field of Classification Search ................... 711/166
See application file for complete search history.

(56) References Cited

U.S. PATENT DOCUMENTS

| 4,247,905 A | * | 1/1981 | Yoshida et al. ............... 711/166 |
| 5,117,493 A | * | 5/1992 | Jensen ......................... 711/140 |
| 5,235,691 A | * | 8/1993 | Hirosawa ...................... 711/106 |
| 5,822,334 A | * | 10/1998 | Whittaker et al. ............ 714/763 |
| 5,826,072 A | * | 10/1998 | Knapp et al. ................. 712/226 |
| 5,943,689 A | * | 8/1999 | Tamer .......................... 711/166 |
| 6,578,123 B1 | * | 6/2003 | Austin et al. ................. 711/165 |
| 6,772,310 B2 | * | 8/2004 | Thompson et al. ........... 711/166 |
| 2003/0084235 A1 | * | 5/2003 | Mizuki ......................... 711/105 |

FOREIGN PATENT DOCUMENTS

| JP | S58-34490 | 2/1983 |
| JP | H03-105640 | 5/1991 |
| JP | H04-64155 | 2/1992 |
| JP | H07-312081 | 11/1995 |

* cited by examiner

Primary Examiner—Sanjiv Shah
Assistant Examiner—Marwan Ayash
(74) Attorney, Agent, or Firm—Pillsbury Winthrop Shaw Pittman LLP

(57) ABSTRACT

A digital signal processor is adapted to a working RAM, which is capable of storing a plurality of data in a rewritable manner and whose storage area is divided into a plurality of sub-areas that are designated by addresses in read/write operations, wherein an operation circuit performs calculations on the data of the working RAM in accordance with a program, and wherein upon detection of a non-access event in which the program does not need to access the working RAM, a write circuit compulsorily writes '0' into the working RAM with regard to each of the prescribed addresses of the prescribed sub-areas subjected to initialization, which are designated by address data. Thus, it is possible to actualize the selective initialization on the prescribed sub-areas within the working RAM without increasing the scale of the peripheral circuitry, without requiring complicated controls, and without increasing the overall processing time therefor.

8 Claims, 14 Drawing Sheets

FIG. 3A

| STEP | PROCESSING CONTENTS | INSTRUCTIONS ||||| 
|---|---|---|---|---|---|---|
| | | FILTER SELECTION SIGNAL | WorkRAM ADDRESS | WorkRAM WRITE | WorkRAM READ | COEFFICIENT MEMORY ADDRESS |
| 0 | NOP | — | — | — | — | — |
| 1 | D11 INPUT | — | D11 | WRITE | — | — |
| 2 | D21 INPUT | — | D21 | WRITE | — | — |
| 3 | FILTER 3a CALCULATION (1) (D11×C11) | 3a | D11 | — | READ | C11 |
| 4 | FILTER 3a CALCULATION (2) (D12×C12) | 3a | D12 | — | READ | C12 |
| 5 | FILTER 3a CALCULATION (3) (D13×C13) | 3a | D13 | — | READ | C13 |
| 6 | FILTER 3b CALCULATION (1) (D21×C21) | 3b | D21 | — | READ | C21 |
| 7 | FILTER 3b CALCULATION (2) (D22×C22) | 3b | D22 | — | READ | C22 |
| 8 | FILTER 3b CALCULATION (3) (D23×C23) | 3b | D23 | — | READ | C23 |
| 9 | D31 WRITING | — | — | WRITE | — | — |
| 10 | NOP | — | — | — | — | — |
| 11 | FILTER 3c CALCULATION (1) (D31×C31) | 3c | D31 | — | READ | C31 |
| 12 | FILTER 3c CALCULATION (2) (D32×C32) | 3c | D32 | — | READ | C32 |
| 13 | FILTER 3c CALCULATION (3) (D33×C33) | 3c | D33 | — | READ | C33 |
| 14 | NOP | — | — | — | — | — |
| 15 | NOP | — | — | — | — | — |

FIG. 3B

| OPERATION STATE OF WorkRAM AT MEMORY INITIALIZATION |
|---|
| — |
| WRITE |
| WRITE |
| READ |
| READ |
| READ |
| WRITE |
| WRITE |
| WRITE |
| WRITE |
| — |
| READ |
| READ |
| READ |
| — |
| — |

FIG. 4A

| ADDRESS | MEMORY CONTENT | REMARKS |
|---|---|---|
| 0 | D11 | FILTER 3a REGION |
| 1 | D12 | |
| 2 | D13 | |
| 3 | D21 | FILTER 3b REGION |
| 4 | D22 | |
| 5 | D23 | |
| 6 | D31 | FILTER 3c REGION |
| 7 | D32 | |
| 8 | D33 | |

FIG. 4B

| ADDRESS | MEMORY CONTENT | REMARKS |
|---|---|---|
| 0 | C11 | FILTER 3a REGION |
| 1 | C12 | |
| 2 | C13 | |
| 3 | C21 | FILTER 3b REGION |
| 4 | C22 | |
| 5 | C23 | |
| 6 | C31 | FILTER 3c REGION |
| 7 | C32 | |
| 8 | C33 | |

FIG. 5

| NO. | PROCESS A | PROCESS B | MEMORY INITIALIZATION | | |
|---|---|---|---|---|---|
| | | | FILTER 3a REGION | FILTER 3b REGION | FILTER 3c REGION |
| 1 | STOP | STOP | OFF | OFF | OFF |
| 2 | STOP | STOP → OPERATE | OFF | ON | ON |
| 3 | STOP | OPERATE | OFF | OFF | OFF |
| 4 | STOP | OPERATE → STOP | OFF | OFF | OFF |
| 5 | STOP → OPERATE | STOP | ON | OFF | ON |
| 6 | STOP → OPERATE | STOP → OPERATE | ON | ON | ON |
| 7 | STOP → OPERATE | OPERATE | ON | OFF | OFF |
| 8 | STOP → OPERATE | OPERATE → STOP | ON | OFF | ON |
| 9 | OPERATE | STOP | OFF | OFF | OFF |
| 10 | OPERATE | STOP → OPERATE | OFF | ON | OFF |
| 11 | OPERATE | OPERATE | OFF | OFF | OFF |
| 12 | OPERATE | OPERATE → STOP | OFF | OFF | OFF |
| 13 | OPERATE → STOP | STOP | OFF | OFF | OFF |
| 14 | OPERATE → STOP | STOP → OPERATE | OFF | ON | ON |
| 15 | OPERATE → STOP | OPERATE | OFF | OFF | OFF |
| 16 | OPERATE → STOP | OPERATE → STOP | OFF | OFF | OFF |

FIG. 6

| SELECTED FILTER | MEMORY INITIALIZATION ENABLE | | | OUTPUT |
|---|---|---|---|---|
| | FILTER 3a REGION | FILTER 3b REGION | FILTER 3c REGION | |
| FILTER 3a | 1 | * | * | 1 (INITIALIZE FILTER 3a REGION) |
| | 0 | * | * | 0 |
| FILTER 3b | * | 1 | * | 1 (INITIALIZE FILTER 3b REGION) |
| | * | 0 | * | 0 |
| FILTER 3c | * | * | 1 | 1 (INITIALIZE FILTER 3c REGION) |
| | * | * | 0 | 0 |

DIGITAL SIGNAL PROCESSOR FOR INITIALIZING A RAM

BACKGROUND OF THE INVENTION

1. Field of the Invention

This invention relates to digital signal processors for use in digital filters and the like in which working random-access memories (i.e., working RAM or WorkRAM in abbreviation) are necessarily subjected to initialization.

This application claims priority from Japanese Patent Applications Nos. 2003-385234, 2004-240705, 2004-297983 and 2004-323735, the contents of which are incorporated herein by reference.

2. Description of the Related Art

Conventionally, digital signal processors have been developed to perform initialization of working RAMs due to multiple processing in accordance with prescribed methods as follows:

(a) All regions of a working RAM are collectively subjected to initialization.
(b) Only a selected region of a working RAM, which is used to accumulate data in the future in order to perform processing, which have not been executed yet, is subjected to initialization.
(c) A working RAM is arranged for each group of data, which can be simultaneously initialized and thus subjected to grouping, so that initialization is performed in each unit of the working RAM.

FIG. 7 shows a three-order finite impulse response (FIR) digital filter as an applied example of a digital signal processor, that is, a digital filter 3 in which input data Din are sequentially transmitted through digital filters Rg11, Rg12, and Rg13. Herein, filtering calculations are performed by retaining input data Din at '0' for a prescribed time period, which is three times longer than a sampling period T for an input signal to the digital filter 3, so that the output signal of the digital filter 3 is subjected to initialization. Suppose that a first time for transmitting input data Din to the input register Rg11, a second time for transmitting data from the input register Rg11 to the first delay register Rg12, and a third time for transmitting data from the first delay register Rg12 to the second delay register Rg13 are all set to 1 msec, wherein it is possible to initialize data respectively stored in the input register Rg11, first delay register Rg12, and second delay register Rg13 as well as the output signal of the digital filter 3 in 3 msec.

However, as to the comprehensive initialization on all regions of the working RAM, there is a problem in that prescribed data, which should not be initialized, are unexpectedly initialized, and the processing, which must run in progress, is unnecessarily stopped for a certain time period of the initialization of the working RAM.

As to the selective initialization on unused regions of the working RAM, the number of regions subjected to initialization changes in response to contents of programs executed by the digital signal processor and the number of programs being executed by the digital signal processor. Hence, it is very difficult for an engineer to directly determine the number of registers designating the overall area subjected to initialization in the digital signal processor. In addition, this increases the burden of a CPU performing processing for designating the number of regions subjected to initialization.

As to the initialization on a FIR digital filter as shown in FIG. 7, a relatively long time is required to complete the initialization, especially in the case of a high-order FIR digital filter and in the case of a FIR digital filter whose data update frequency is relatively low. As to the initialization on an IIR (infinite impulse response) digital filter, due to the existence of a feedback loop therein, the output data thereof cannot be initialized even when '0' is continuously applied thereto.

As to the conventionally known high-speed initialization of memories, Japanese Patent Application Publication No. S58-34490 discloses that a prescribed command (regarding partial clearing) for clearing memory content in a specific area is used for the initialization of a display memory in display content renewing (or display refreshing), wherein the initialization is selectively performed on a specific area whose display content is changed, so that the initialization necessarily proceeds to only the specific area during operation.

Other documents such as Japanese Patent Application Publications Nos. H07-312081, H03-105640, and H04-64155 disclose the high-speed initialization of memories in which in order to increase the speed of initialization of memories in a startup mode of an apparatus, addresses are subjected to masking so as to extract groups of addresses subjected to initialization, and peripheral circuits of RAMs are reduced in sizes, thus reducing the time required for the initialization.

SUMMARY OF THE INVENTION

It is an object of the invention to provide a digital signal processor that can perform initialization selectively on a specific area of a working RAM without increasing the overall scale of the peripheral circuitry, without performing complicated controls, and without increasing the processing time for the initialization.

In a first aspect of the invention, a digital signal processor comprises a data storage capable of storing a plurality of data in a rewritable manner, an operation circuit for performing calculations on data sequentially read from the data storage, a write circuit for compulsorily writing '0' into a prescribed address of the data storage, and a logic circuit for driving the write circuit in synchronization with an address signal applied to the data storage.

In a second aspect of the invention, a digital signal processor comprises a program memory for storing a program, an operation means for performing calculations in accordance with the program, and a data storage that temporarily stores data used in calculations and that is divided into a plurality of sub-areas designated by read/write addresses by the program. The digital signal processor also comprises a register for storing data designating sub-areas subjected to initialization, an address data generator for generating address data designating addresses of the data storage subjected to initialization on the basis of the data of the register, a non-access detector for detecting a non-access event in which the program does not need to access the data storage, and a write circuit for, upon detection of the non-access event, supplying the address data to the data storage and for writing '0' into the designated address of the data storage. Herein, the address data are created based on a top address of a prescribed sub-area, which is determined based on the data of the register, and a count value that is increased upon the detection of the non-access event.

In a third aspect of the invention, a digital signal processor comprises a program memory for storing a program, an operation means for performing calculations in accordance with the program, a data storage that temporarily stores data used in calculations and that is divided into a plurality of sub-areas, which are designated by relative addresses included in the program in read/write operations, an address counter, and an absolute address generation means for generating absolute addresses for the data storage on the basis of the relative addresses and the output of the address counter. The digital signal processor also comprises a register for storing data designating sub-areas subjected to initialization, an address data generator for generating address data designating relative addresses subjected to initialization based on the data of the register, a non-access detector for detecting a non-access event in which the program does not need to access the data storage, and a write circuit for upon detection of the non-access event, supplying the absolute addresses to the data storage and for writing '0' into the designated addresses of the data storage, wherein in response to a change of the output of the address counter, the address data is compulsorily replaced with '0'.

In the above, it is possible to use first and second registers each of which stores the same data designating the prescribed sub-areas to be subjected to initialization. Herein, address data designating relative addresses of the data storage subjected to initialization are generated based on the data of the first register. At the completion of the initialization of the sub-area, the corresponding data of the first register is cleared. In response to a change of the output of the address counter, initialization is performed on the relative address '0' designated by the data of the second register.

As a result, the digital signal processor is capable of initializing specific addresses of the data storage (e.g., a working RAM) by a simple circuit configuration without the intervention of an external CPU.

BRIEF DESCRIPTION OF THE DRAWINGS

These and other objects, aspects, and embodiments of the present invention will be described in more detail with reference to the following drawings, in which:

FIG. 3A shows a list of instructions that are stored in connection with steps '0' to '15';

FIG. 3B shows operation states of a working RAM shown in FIG. 1 at a memory initialization mode;

FIG. 4A shows a memory map of the working RAM;

FIG. 4B shows a memory map of a coefficient memory shown in FIG. 1;

FIG. 5 shows on/off states of memory initialization with respect to regions of digital filters in the working RAM;

FIG. 6 is a truth table regarding initialization control realized by a logic circuit shown in FIG. 1;

DESCRIPTION OF THE PREFERRED EMBODIMENTS

This invention will be described in further detail by way of examples with reference to the accompanying drawings.

1. First Embodiment

Figure 1:
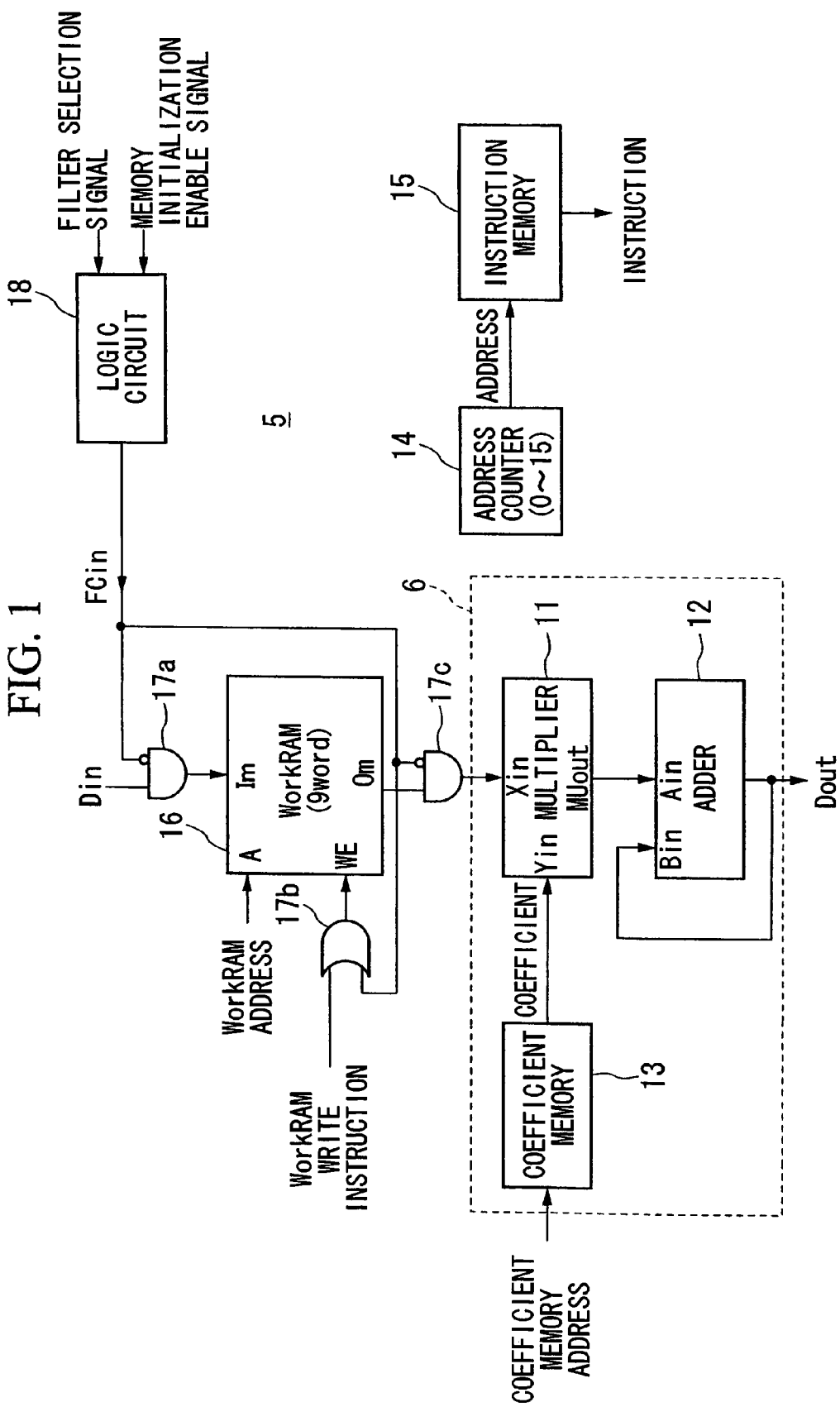
FIG. 1 is a block diagram showing the overall constitution of a digital signal processor in accordance with a first embodiment of the invention.
Figure 2:
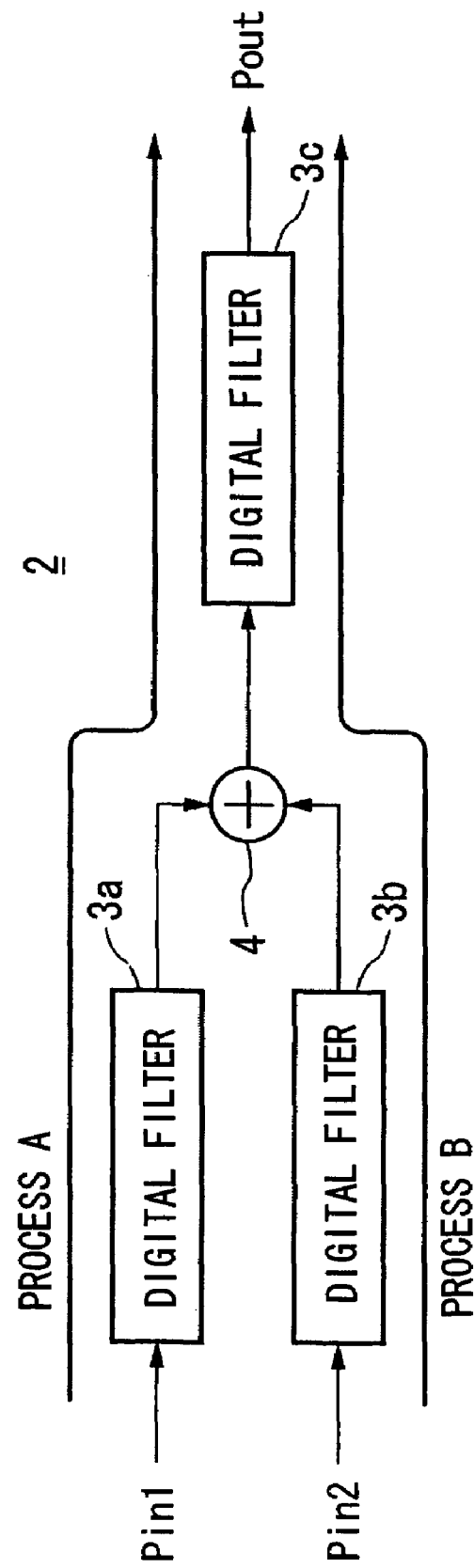
FIG. 2 is a simplified block diagram showing a signal processing system realized by the digital signal processor of FIG. 1.

FIG. 1 is a block diagram showing the overall constitution of a digital signal processor 5 in accordance with a first embodiment of the invention; and FIG. 2 is a simplified block diagram showing a signal processing system 2 that is actualized by the digital signal processor 5. The signal processing system 2 comprises digital filters 3a, 3b, and 3c, each having different characteristics, and a mixer (or an adder) 4. It performs two series of processes, namely, a process A in which output data Pout is produced in response to input data Pin1, and a process B in which output data Pout is produced in response to input data Pin2.

Next, the details of the processing of the signal processing system 2 will be described. In the process A, the digital filter 3c performs operation after the operation of the digital filter 3a. In the process B, the digital filter 3c performs operation after the operation of the digital filter 3b. In order to simultaneously perform the process A and the process B, both of the operation result of the digital filter 3a and the operation result of the digital filter 3b are supplied to the mixer 4 in which they are mixed together and are subjected to the operation of the filter 3c.

Figure 7:
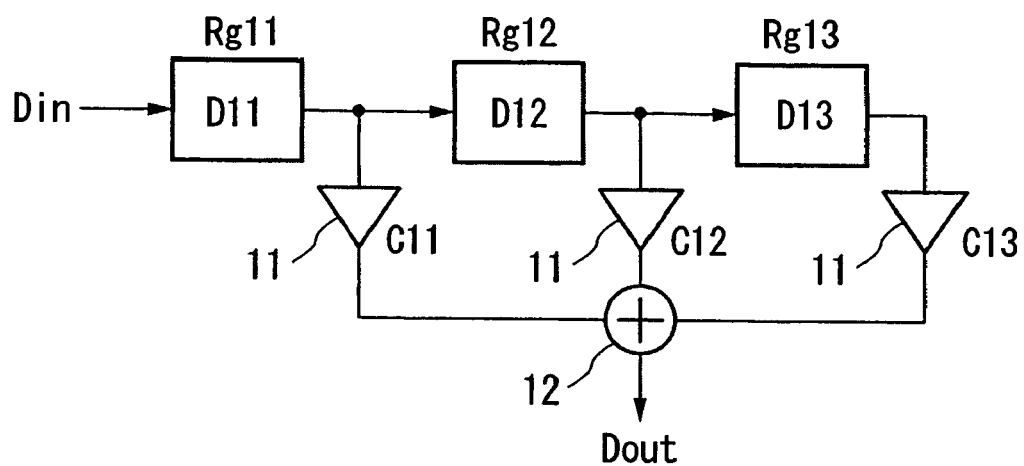
FIG. 7 is a circuit diagram showing an example of a three-order FIR digital filter.

Each of the digital filters 3a, 3b, and 3c substantially has the same constitution of the three-order FIR digital filter 3 shown in FIG. 7. The functions of the digital filters 3a, 3b, and 3c are actualized by the digital signal processor 5 shown in FIG. 1. That is, the digital signal processor 5 performs calculations multiple times by use of coefficients and data input thereto with regard to processes that are performed in a time-division manner.

In FIG. 1, the digital signal processor 5 comprises a signal processing block 6, which includes a multiplier 11, an adder 12, an a coefficient memory 13, an address counter 14, an instruction memory 15, a working RAM (namely, a WorkRAM) 16, gate circuits 17a, 17b, and 17c, and a logic circuit 18. The word length of the working RAM 16 is set to nine words.

The address counter 14 increments an address value for the instruction memory 15, wherein the address value can be sequentially increased one by one in a range from '0' to '15'. The instruction memory 15 outputs an address designating an accessed region to an input terminal A of the working RAM 16. In order to write data into the working RAM 16, it outputs a WorkRAM write instruction to an input terminal (i.e., a write-enable terminal) WE of the working RAM 16 via an OR gate 17b. Herein, data Din to be written into the working RAM 16 is supplied to an input terminal Im of the working RAM 16 via an AND gate 17a. In order to read and supply data from the working RAM 16 to the multiplier 11, the instruction memory 15 outputs a WorkRAM read instruction to an input terminal (i.e., a read-enable terminal) RE (not shown) of the working RAM 16. The data output from an output terminal Om of the working RAM 16 is supplied to an input terminal Xin of the multiplier 11.

The logic circuit 18 receives a filter selection signal from the instruction memory 15 and a memory initialization enable signal from an external CPU (not shown), based on which it performs logical operations. In order to compulsorily initialize a specific region of the working RAM 16, the logic circuit 18 outputs a memory initialization signal FCin to input terminals of the gate circuits 17a, 17b, and 17c, which are connected in common.

The coefficient memory 13 outputs a coefficient, which is used in processing, to an input terminal Yin of the multiplier 11 on the basis of a coefficient memory address that is output from the instruction memory 15 and is supplied thereto. The multiplier 11 multiplies the data, which is output from the working RAM 16 and is input to the input terminal Xin thereof, by the coefficient that is read and supplied from the coefficient memory 13 to the input terminal Yin thereof. Then, the multiplication result produced by the multiplier 11 is output from an output terminal MUout thereof and is supplied to an input terminal Ain of the adder 12. The adder 12 adds the 'present' input data of the input terminal Ain thereof to an addition result, which was produced one clock period before the present timing, thus producing an output signal Dout.

Next, the details of the processing of the signal processing system 2 will be described. As shown in FIG. 2, the signal processing system 2 comprises the digital filters 3a, 3b, and 3c, the functions of which are actualized by the digital signal processor 5 performing calculations multiple times. Hereinafter, the overall operation of the digital signal processor 5 actualizing the functions of the signal processing system 2 will be described in detail.

First, when power is applied to the digital signal processor 5 so that all regions of the working RAM 16 are completely initialized, the logic circuit 18 supplies the 'common' input terminals of the gate circuits 17a, 17b, and 17c with a memory initialization signal FCin, which is set to '0', whereby the gate circuits 17a, 17b, and 17c are all opened. Thus, the working memory 16 is directly supplied with input data Din via the gate circuit 17a at the input terminal Im thereof, and a WorkRAM write instruction via the gate circuit 17b at the write-enable terminal WE thereof; and it also directly outputs data from the output terminal Om thereof.

FIG. 3A shows a list of instructions that are described in the instruction memory 15 in connection with steps '0' to '15', wherein the symbol 'NOP' represents 'Non Operation'. FIG. 3B shows operation states of the working RAM 16 at a memory initialization mode, which will be described later.

FIG. 4A shows a memory map of the working RAM 16, and FIG. 4B shows a memory map of the coefficient memory 13. Herein, data Dwx (where w=1, 2, 3; and x=1, 2, 3) is written at and read from each of nine addresses (ranging from '0' to '8') of the working RAM 16 shown in FIG. 4A. Specifically, the aforementioned registers Rg11 to Rg13 of the digital filter 3 shown in FIG. 7 are respectively connected with the addresses of the working RAM 16, wherein the input register Rg11 corresponds to the address "3(w−1)" (where w=1, 2, 3); the first delay register Rg12 corresponds to the address "3(w−1)+1"; and the second delay register Rg13 corresponds to the address "3(w−1)+2". Data Cwx (where w=1, 2, 3; and x=1, 2, 3) designate coefficients for the digital filters 3a, 3b, and 3c respectively.

The aforementioned data and coefficients are defined using the suffix 'w' as follows:

Data D1x (where x=1, 2, 3) are used for the digital filter 3a; data D2x are used for the digital filter 3b; and data D3x are used for the digital filter 3c. Similarly, coefficients C1x (where x=1, 2, 3) are used for the digital filter 3a; coefficients C2x are used for the digital filter 3b; and coefficients C3x are used for the digital filter 3c.

In addition, the addresses of the working RAM 16 shown in FIG. 4A are defined using the suffix 'w' and are classified into data registers used for the digital filters 3a, 3b, and 3c respectively.

Next, the overall operation of the digital filter 3a will be described.

The digital signal processor 5 performs processing in accordance with instructions that are stored in the instruction memory 15 and are read from the instruction memory 15 in accordance with addresses output from the address counter 14. Herein, processing is adequately performed using the aforementioned data and coefficients, which are read from and written into the memory maps regarding the working RAM 16 (see FIG. 4A) and the coefficient memory 13 (see FIG. 4B) respectively in response to addresses defined by the read instructions. For example, step 1 in FIGS. 3A and 3B describes a process of "D11 INPUT" in which input data Din is written into the working RAM 16 as "D11". In this process, a specific address corresponding to D11 is designated in the working RAM 16 being accessed by the instruction memory 15. The designated address corresponding to D11 is supplied from the memory map regarding the working RAM 16 to the address terminal A of the working RAM 16 so as to designate address 0 shown in FIG. 4A. At the same time, the instruction memory 15 issues a WorkRAM write instruction, which is supplied to the write-enable terminal WE of the working RAM 16, whereby the input data Din is written into the area of address 0 of the working RAM 16, which thus stores it as data D11.

Step 3 shown in FIGS. 3A and 3B describes a process of "FILTER 3a CALCULTAION (D11×C11)" in which the digital filter 3a is designated to perform calculation of D11×C11. In this process, the instruction memory 15 outputs a filter selection signal selecting the digital filter 3a.

In addition, the instruction memory 15 designates a prescribed address corresponding to D11 as the 'accessed' address of the working RAM 16, so that the designated address is applied to the address terminal A of the working RAM 16 so as to designate address 0. At the same time, the instruction memory 15 issues a WorkRAM read instruction, which is supplied to a read-enable terminal RE (not shown) of the working RAM 16, so that the data D11 is read from the area of address 0 of the working RAM 16. Furthermore, another address corresponding to C11 is designated as a 'memory coefficient address' being accessed by the instruction memory 15. The memory coefficient address is applied to the coefficient memory 13 as address 0 read from the coefficient memory map shown in FIG. 4B, so that a coefficient C11 is read from address 0 of the coefficient memory 13. The data D11 and the coefficient C11 are supplied to the multiplier 11, which thus actualizes the calculation of the digital filter 3a, i.e., multiplication of D11×C11.

Similar calculations are performed with respect to the address (0, 1, 2, 3, . . . , 14, and 15) output from the address counter 14, wherein the address is incremented in each step and is then reverted to '0' so that the aforementioned instructions are repeated. Herein, one-cycle calculation in which the address sequentially changes from '0' to '15' is performed in synchronization with the sampling period T of the input signal of the digital signal processor 5.

In order to produce the output signal Dout of the three-order FIR digital filter 3 shown in FIG. 7, it is necessary to perform calculations using D1x and C1x (where x=1, 2, 3) in accordance with the following equation:

$$Dout = D11 \times C11 + D12 \times C12 + D13 \times C13$$

For this reason, the external CPU (not shown) must have a capability of controlling the digital signal processor 5 to perform the aforementioned calculations in three cycles upon establishing relationships between the data D1x (where x=1, 2, 3).

That is, in the second cycle of calculations, data originally stored at address 1 is transferred to address 2; data originally stored at address 0 is transferred to address 1; and input data Din of the digital filter 3a is written at address 0. In the third cycle of calculations, the data stored at address 1 in the second cycle of calculations is transferred to address 1; the data stored at address 0 in the second cycle of calculations is transferred to address 0; and the input data Din presently input to the digital filter 3a is written at address 0.

As described above, in the third cycle of calculations, the input data Din presently input to the digital filter 3a is written into address 0; the data previously stored at address 0 one sampling period T prior to the present timing is written into address 1; and the data previously stored at address 0 two sampling periods '2T' prior to the present timing is written into address 2. Thus, the external CPU can actualize shift-register functions in the working RAM 16 with respect to the data D1x (where x=1, 2, 3) respectively stored at address 0, address 1, and address 2.

After the completion of the third cycle of calculations, necessary data are reliably written into address 1 and address 2, which originally store uncertain data or previous data. Then, the calculation of the aforementioned equation is performed to produce the output data Dout. That is, the external CPU actualizes shift-register functions in the working RAM 16 with respect to the data D1x (where x=1, 2, 3) by performing three cycles of calculations, thus reliably actualizing functions of the digital filter 3a.

As described above, the digital signal processor 5 is designed to perform multiple processing, which may result in uncertain data or previous data remaining in the working RAM 16 when it firstly starts processing or when it restarts processing by changing data. For this reason, it is necessary to perform initialization on the digital signal processor 5.

Suppose that the process A and the process B are performed independently of each other. In this case, it is possible to presume the following conditions.
(i) First condition in which the process A operates in progress, but the process B is stopped.
(ii) Second condition in which the process B operates in progress, but the process A is stopped.
(iii) Third condition in which both of the process A and the process B operate in progress.
(iv) Fourth condition in which both of the process A and the process B are stopped.

According to the present embodiment, even when the digital signal processor 5 proceeds to the first cycle of calculations in the first condition in which the process B is stopped, it handles instructions regarding the digital filter 3b (see steps 2, 6-8 in FIGS. 3A and 3B) without skipping them. That is, the address counter 14 increments the address thereof (which is sequentially changed from '0' to '15') in each of steps so as to repeat instructions thereof, regardless of an event in which the prescribed process operates in progress or is stopped.

Specifically, the digital signal processor 5 provides a circuit (not specifically shown in FIG. 1) that compulsorily sets the input of the multiplier 11 to zero, wherein calculations regarding the digital filter 3b do not affect the operation result of the digital signal processor 5, which thus operates to apparently ignore the processing of the digital filter 3b, whereby it is possible to apparently actualize the first condition in which the process B regarding the digital filter 3b is stopped, so that the digital signal processor 5 takes the normal processing time even though the process B is apparently stopped.

FIG. 5 shows on/off states of memory initialization in various operating conditions with regard to the regions of the digital filters 3a, 3b, and 3c actualized in the working RAM 16, wherein the expression of "STOP→OPERATE" indicates that the processing is changed from the stopped state to the operating state, and the expression of "OPERATE→STOP" indicates that the processing is changed from the operating state to the stopped state. When "MEMORY INITIALIZATION" is "ON" in FIG. 5, the instruction memory 15 supplies the logic circuit 18 with a memory initialization enable signal that is set to '1' so as to validate the memory initialization.

For example, when the process B is started during the progression of the process A, it is necessary to perform initialization on the region regarding the process B in the working RAM 16 without affecting the process A. Specifically, column no. 10 of FIG. 5 indicates that the region of the digital filter 3b can be subjected to initialization, whereas the initialization is inhibited with respect to the digital filters 3a and 3c. Therefore, it is necessary for the digital signal processor 5 to perform initialization on only the region of the digital filter 3b in the working RAM 16. In addition, the initialization is unnecessary for the region of the digital filter 3c in the working RAM 16 while the process A or the process B operates in progress.

Next, a description will be given with respect to the operation in which the logic circuit 18 outputs a memory initialization signal FCin to the gate circuits 17a, 17b, and 17c so as to initialize a specific area of the working RAM 16.

FIG. 6 shows a truth table for the logic circuit 18 in terms of initialization controls, wherein a symbol "*" designates an arbitrarily value being set to each column. In order to start the process B during the process A in progress, it is necessary to initialize the region of the digital filter 3b in the working RAM 16 before the process B is started. It is preferable to set the timing of initializing the region of the digital filter 3b within the time period regarding the processing that is not related to the process A. That is, the logic circuit 18 outputs the memory initialization signal FCin so as to initialize the region of the digital filter 3b in the working RAM 16 during the time period (i.e., steps 6-8, see FIGS. 3A and 3B) in which the processing of the digital filter 3b, which is originally stopped, now operates in progress.

In other words, as shown in FIG. 6, during the time period regarding steps 6-8 in which the instruction memory 15 supplies the logic circuit 18 with a filter selection signal '3b' declaring that the processing of the digital filter 3 now operates in progress, the external CPU outputs the memory initialization enable signal, which is set to '1', to the logic circuit 18, which thus performs the logical operation on the filter selection signal and the memory initialization enable signal. As a result, the logic circuit 18 transmits the memory initialization enable signal, which is set to '1' with respect to the region of the digital filter 3b. At this time, in order to actualize the calculation of D2x×C2x (where x=1, 2, 3), the instruction memory 15 outputs the filter selection signal '3b' declaring that the processing of the digital filter 3*b* now operate in progress as well as read instructions for reading data D21, D22, and D23 from address 3, address 4, and address 5 of the working RAM 16 respectively.

Upon receipt of the memory initialization signal FCin, which is set to '1' from the logic circuit 18, the gate circuit 17*a* outputs '0' to input terminal Im of the working RAM 16; the gate circuit 17*b* outputs '1' to the write-enable terminal WE so as to validate write operation on the working RAM 16; and the gate circuit 17*c* outputs '0' to the input terminal Xin of the multiplier 11. Incidentally, the gate circuit 17*c* is not necessarily included in the digital signal processor 5, whereas it is preferable to incorporate the gate circuit 17*c* when the working RAM 16 is designed not to produce the output data of '0' at a write mode.

As shown in column no. 10 of FIG. 5, in the foregoing steps 6-8 (see FIGS. 3A and 3B), the gate circuits 17*a* and 17*b* perform initialization, wherein in response to the memory initialization signal FCin output from the logic circuit 18, '0' is compulsorily written into address 3, address 4, and address 5 of the working RAM 16 respectively. Then, the digital signal processor 5 reads data D21, D22, and D23 (all indicating '0') from address 3, address 4, and address 5 of the working RAM 16, so that the read data are supplied to the input terminal Xin of the multiplier 11 via the gate circuit 17*c*. Thus, it is possible to completely initialize the prescribed area regarding the process B in the working RAM 16 without affecting the process A.

According to the present embodiment described above, it is possible for the digital signal processor 5 to perform initialization on the selected area of the working RAM 16, which should be initialized, without affecting the overall processing presently proceeded therein and without increasing the overall processing time thereof.

The digital signal processor 5 of the present embodiment is designed to actualize the function of the three-order FIR digital filter. Of course, this invention can be adapted to any types of digital filters, regardless of its degree of order.

The present embodiment is designed such that before the prescribed process originally stopped is restarted, the corresponding area of the working RAM 16 is initialized. Of course, it is possible to modify the present embodiment in such a way that just after the prescribed process is stopped, the initialization is performed so as to prepare for the restart of the process. In this case, it is possible for the digital signal processor 5 to skip the prescribed steps regarding the designated digital filter, which is apparently stopped in processing until the process is restarted after the corresponding area of the working RAM 16 is initialized, whereby it is possible to reduce the overall processing time.

It is possible to further modify the present embodiment in such a way that in order to prevent unnecessary data from being output as the operation result of filter processing in a stop mode of each digital filter, the corresponding area of the working RAM 16 is automatically initialized.

2. Second Embodiment

Figure 8:
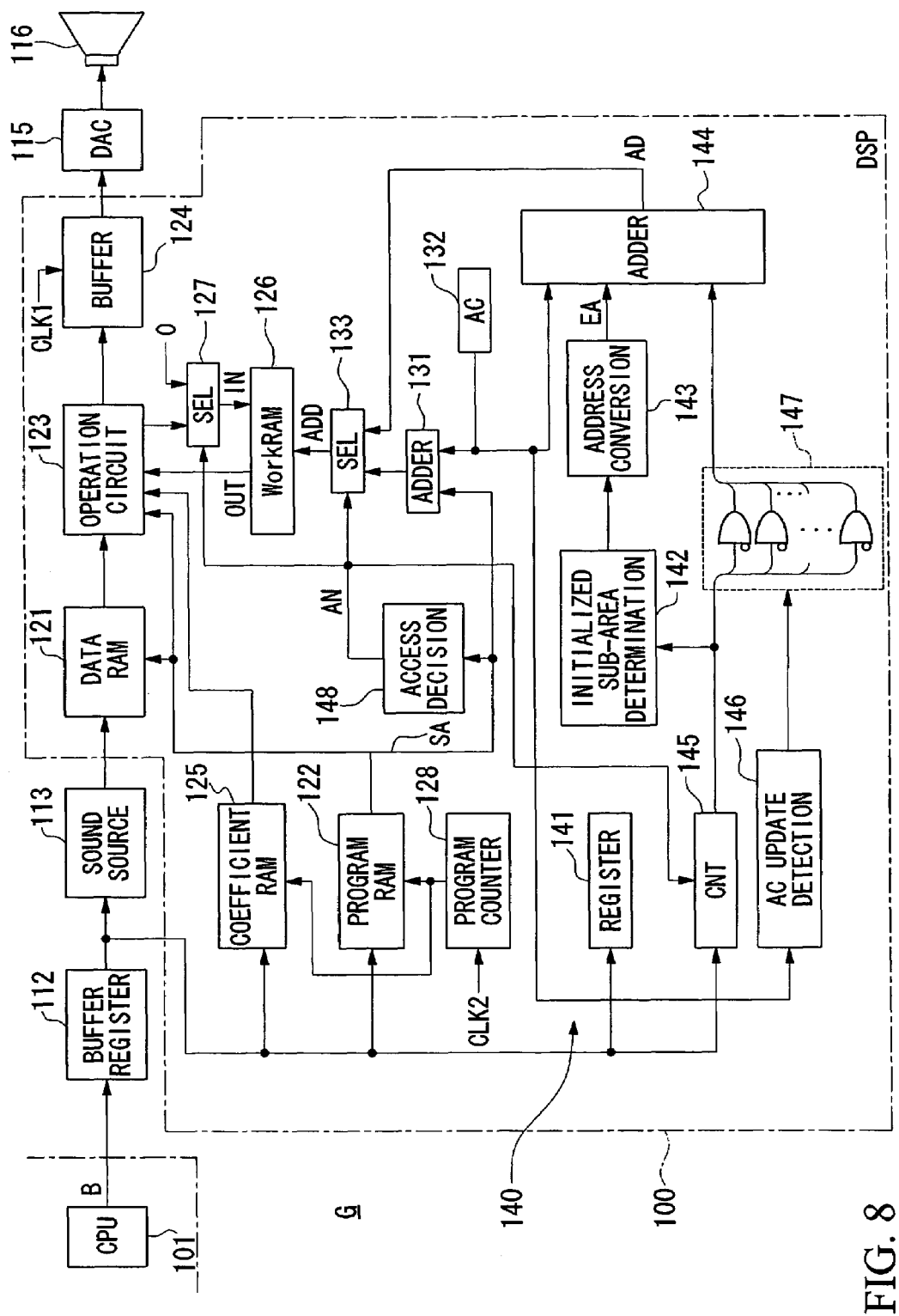
FIG. 8 is a block diagram showing the constitution of a musical tone signal generation circuit including a digital signal processor in accordance with a second embodiment of the invention.
Figure 9:
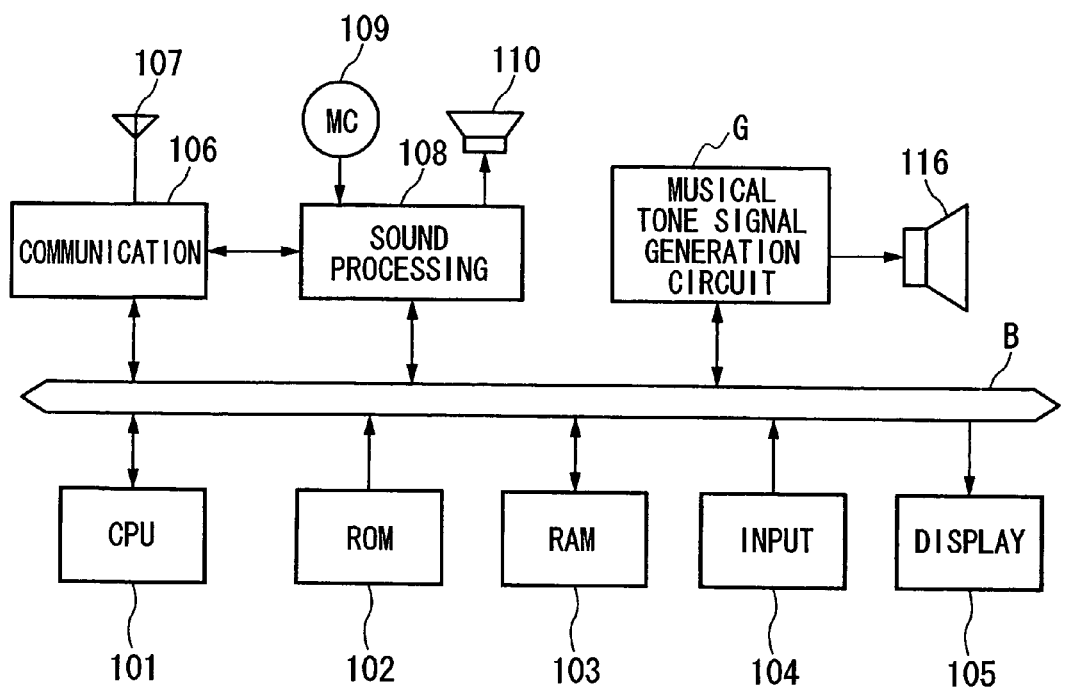
FIG. 9 is a block diagram showing the constitution of a portable telephone incorporating the musical tone signal generation circuit shown in FIG. 8.

FIG. 8 is a block diagram showing the constitution of a musical tone signal generation circuit (or a tone generator) G, which incorporates a digital signal processor 100 in accordance with a second embodiment of the invention. FIG. 9 is a block diagram showing the constitution of a portable telephone (e.g., a mobile phone or a cellphone) incorporating the musical tone signal generation circuit G.

In FIG. 9, reference numeral 101 designates a central processing unit (i.e., a CPU) that controls circuits and devices in the portable telephone, wherein the CPU 101 performs normal communication and conversation processing as well as other processing regarding game programs and the like. Reference numeral 102 designates a read-only memory (i.e., a ROM) that stores communication/conversation processing programs, game programs, music reproduction processing programs, etc. Reference numeral 103 designates a non-volatile random-access memory (i.e., a RAM), which temporarily stores various data created during the execution of processes.

Reference numeral 104 designates an input unit such as a ten-key unit for inputting telephone numbers and the like, and various function keys. Reference numeral 105 designates a display such as a liquid crystal display. Reference numeral 106 designates a communication unit having an antenna 107, which modulates carrier waves by transmission data so as to transmit them via the antenna 107. In addition, the communication unit 106 demodulates incoming signals received by the antenna 107 so as to output 'demodulated' incoming signals to the CPU 101 and/or a sound processing unit 108. The sound processing unit 108 converts audio signals, which correspond to sounds picked up by a microphone 109, into digital data, wherein it compresses the digital data to produce transmission data, which are then supplied to the communication unit 106. In addition, the sound processing unit 108 expands 'compressed' audio data from the communication unit 106 and converts them into analog audio signals, which are then supplied to a speaker 110. The musical tone signal generation circuit G generates various types of musical tone signals regarding sound-effect music of games, musical pieces appreciated by listeners, etc. The musical tone signals are supplied to a speaker 116.

Next, the details of the musical tone signal generation circuit G will be described with reference to FIG. 8.

In FIG. 8, reference numeral 112 designates a buffer register that temporarily stores various data and control instructions, which are supplied thereto from the CPU 101 via a bus line B and are then supplied to a sound source circuit 113 and internal circuits of the digital signal processor. Upon receipt of an incoming call melody generation instruction from the CPU 101 via the buffer register 112, the sound source circuit 113 generates digital musical tone signals (i.e., PCM data) representing an incoming call melody. When receiving a sound-effect music generation instruction for games, the sound source circuit 113 generates PCM data representing the sound-effect music of games. The digital signal processor 100 is capable of imparting the prescribed sound effect, three-dimensional (3D) sound effect, wide-stereo effect, and the like to digital musical tone signals, so that such effect-imparted musical tone signals are supplied to a digital-to-analog converter (DAC) 115. The DAC 115 converts digital musical tone signals to analog musical tone signals, which are then supplied to a speaker 116.

In the digital signal processor 100, reference numeral 121 designates a data RAM that temporarily stores pulse-code modulated data (or PCM data) output from a sound source circuit 113 so as to supply the stored data to an operation circuit 123 in accordance with a program output from a program RAM 122. The operation circuit 123 performs calculations (e.g., arithmetic operations and/or logical operations) on the PCM data, output from the data RAM 121, in accordance with the program output from the program RAM 122. Herein, calculations are performed using coefficients output from a coefficient RAM 125. The operation circuit 123 outputs calculation progressed partway data (or calculation interrupted data) to a working RAM 126 via a selector 127, wherein the calculation interrupted data are written into the working RAM 126 at an address designated by the aforementioned program. In addition, the operation circuit 123 performs calculations using data read from the working RAM 126 at an address designated by the program.

Reference numeral 124 designates a buffer memory, which temporarily stores PCM data output from the operation circuit 123 and which outputs them to the DAC 15 at the timing defined by a clock pulse signal CLK1. The clock pulse signal CLK1 consists of pulses whose frequency matches the sampling frequency (e.g., 48 kHz) of the PCM data.

The program RAM 122 stores various programs such as the effect program, three-dimensional sound effect program, and wide-stereo effect program, each of which can be rewritten in accordance with a prescribed program output from the CPU 101. Each program contains a plurality of steps, each of which further contains read/write addresses for the data RAM 121, an operation instruction for the operation circuit 123, and read/write addresses for the working RAM 126.

The program RAM 122 is capable of storing maximally 768 steps of programs, wherein steps are sequentially read out in accordance with address data output from a program counter 128. Suppose that the effect program is stored in the area defined between address 0 and address 150, and the three-dimensional sound effect program is stored in the area defined between address 151 to 767, wherein the program counter 128 sequentially increments the counter value thereof and outputs it to an address terminal of the program RAM 122. In accordance with the count value of the program counter 128, the effect program is firstly read out, so that the prescribed effect is imparted to the PCM data output from the data RAM 121. Then, the three-dimensional sound effect program is read out, so that the three-dimensional sound effect is imparted to the effect-imparted PCM data.

The coefficient RAM 125 stores coefficients used for calculations performed in the operation circuit 123 in advance. Specifically, it stores 768 coefficients in total in correspondence with 768 steps of programs stored in the program RAM 122. The program counter 128 is capable of handling 768 increments in counting. That is, the program counter 128 counts from '0' to '767' repeatedly in response to a clock pulse signal CLK2 whose frequency is calculated as follows:

$$48\ kHz \times 768 = 36.864\ MHz$$

Next, a description will be given with respect to the working RAM 126 and its address circuit.

Figure 10:
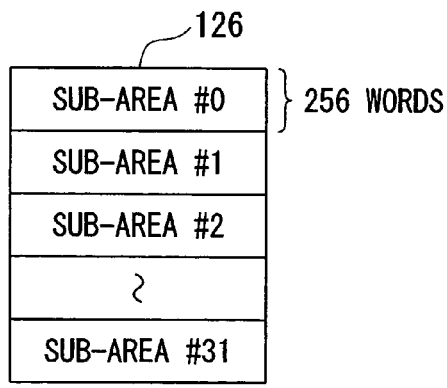
FIG. 10 diagrammatically shows the constitution regarding sub-areas of a working RAM shown in FIG. 8.

The working RAM 126 is configured as a 8k-word RAM capable of storing eight kilo words, wherein as shown in FIG. 10, the overall area thereof is divided into 'consecutive' 32 sub-areas (each storing 256 words) #0 to #31. A single program occupies a part of the working RAM 126 in units of sub-areas. Suppose that the effect program occupies four sub-areas, and the three-dimensional sound effect program occupies three sub-areas, wherein these programs are normally assigned to consecutive sub-areas. For example, the effect program is assigned to sub-areas #0, #1, #2, and #3, and the three-dimensional sound effect program is assigned to sub-areas #4, #5, and #6. However, due to the requirement of processing (or due to a change of a program), each program cannot be always assigned to consecutive sub-areas. For example, the effect program is assigned to sub-areas #0, #1, #10, and #20, and the three-dimensional sound effect program is assigned to sub-areas #2, #5, and #28. That is, each program is not necessarily assigned to consecutive sub-areas.

The program RAM 122 designates read/write addresses for the working RAM 126, wherein it outputs relative addresses 'SA', which are added with the output (i.e., absolute address) of an address counter (AC) 132 in an adder 131 and are converted into absolute addresses (or physical addresses). Absolute addresses are supplied to an address terminal of the working RAM 126 via a selector 133 as read/write addresses.

Figure 11:
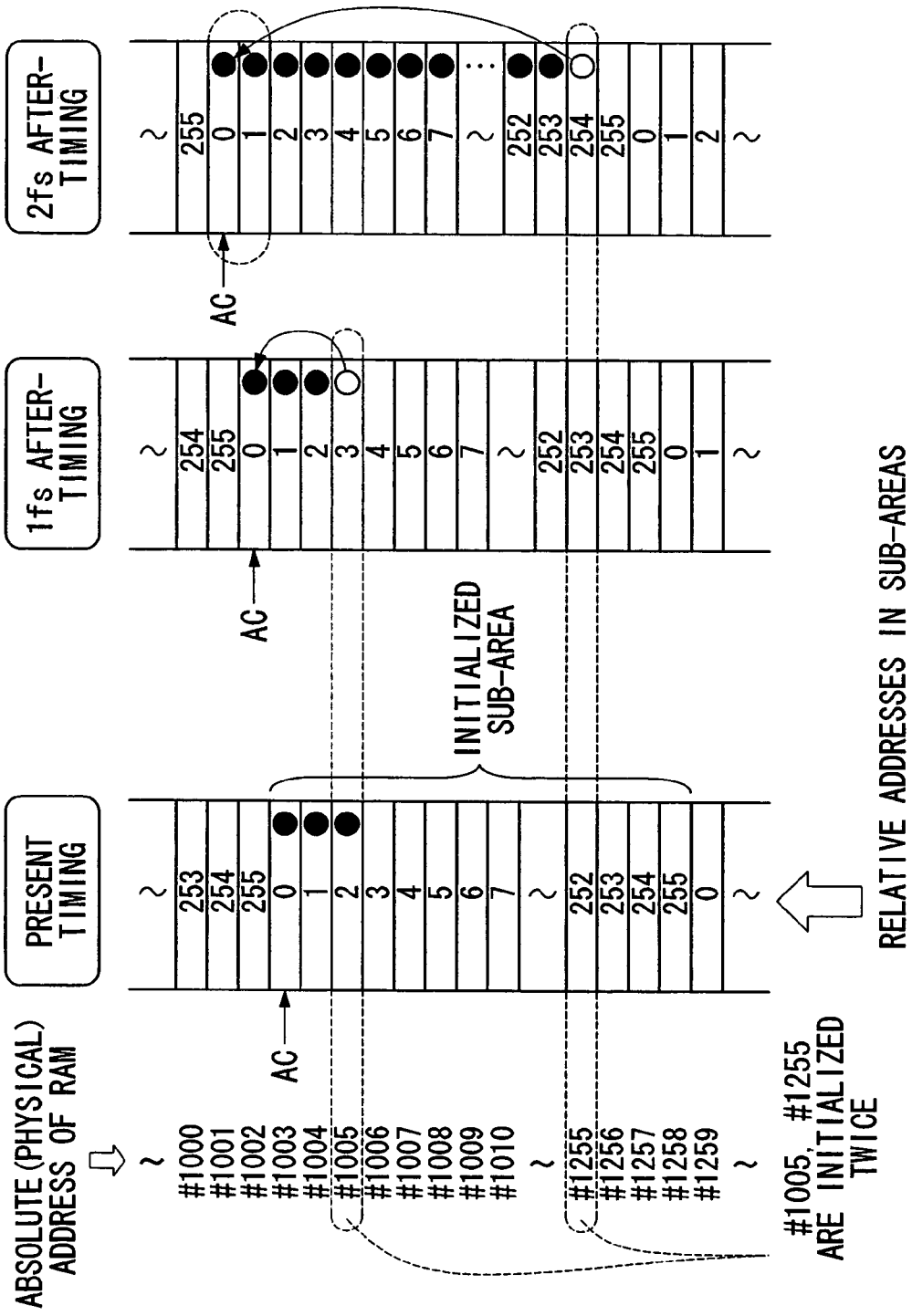
FIG. 11 diagrammatically shows time-related variations of relative addresses in relation to absolute addresses of a working RAM so as to explain an initialization process performed by an initialization circuit incorporated in the digital signal processor shown in FIG. 8.

Reasons why the present embodiment uses relative addresses are as follows:

The operation circuit 123 performs calculations regarding digital filtering, e.g., calculations regarding FIR filtering shown in FIG. 7. Herein, it is necessary that data of the register Rg11 be transferred to the register Rg12, and data of the register Rg12 be transferred to the register Rg13 in accordance with the timing defined by the clock pulse signal CLK1. However, when such data-shift operations are executed in accordance with the software program, it is necessary to provide numerous steps in the program, which eventually increasing the processing time. For this reason, the present embodiment is designed such that data are not actually subjected to one-address shifting, but the relative address is subjected to one-address shifting in a reverse direction, thus actualizing the same effect of the data shifting. This is shown in FIG. 11, wherein the output of the address counter (AC) 132, which originally designates an absolute address for the working RAM 126 at the certain fs timing, is automatically moved to a preceding address that is one absolute address (or one physical address) prior to the present address every time one period of the clock pulse signal CLK1 (referred to as "1fs") elapses. Suppose that the address counter 132 presently designates absolute address #1003; then, the address counter 132 designates absolute address #1002 at 1fs after-timing that is 1fs after the present timing; thereafter, the address counter 132 designates absolute address #1001 at 2fs after-timing that is 2fs after the present timing. Incidentally, the address presently designated by the address counter 132 is referred to as relative address 0.

Next, a description will be given with respect to an initialization circuit 140 that initializes sub-areas of the working RAM 126 designated by the CPU 101.

The initialization circuit 140 comprises a register 141, an initialized sub-area determination circuit 142, an address conversion circuit 143, an adder 144, a counter (CNT) 145, an address counter (AC) update detection circuit 146, an AND gate unit 147, and an access decision circuit 148.

The register 141 is a 32-bit register, into which the CPU 101 writes data designating an initialized sub-area. For example, when the CPU 101 designates sub-areas #0, #1, #10, and #20 to be initialized, the following 32-bit data is written into the register 141.

"11000000001000000000100000000000"

In the aforementioned data, each bit corresponds to each sub-area, wherein different-sub areas are respectively allocated to thirty-two bits counting from the most significant bit (MSB) to the least significant bit (LSB) in the order of #0, #1, #2, . . . , and #31. Herein, '1' is set to each of prescribed bits designating sub-areas that should be initialized.

As described above, the absolute address of each sub-area changes sequentially in accordance with the output (i.e., absolute address) of the address counter 132. For example, the relative address set to sub-area #0 normally ranges from '0' to '255', while as shown in FIG. 11, the corresponding absolute address ranges from #1003 to #1258 at the present timing; it ranges from #1002 to #1257 at 1fs after-timing; and it ranges from #1001 to #1256 at 2fs after-timing.

The initialized sub-area determination circuit 142 sequentially inputs bits of data stored in the register 141 from its leftmost position so as to determine an initialized sub-area, which should be initialized, so that it outputs a number of the initialized sub-area determined therein to the address conversion circuit 143. For example, the initialized sub-area determination circuit 142 outputs '0' representing the number of the sub-area #0 to the address conversion circuit 143. When the count value of the counter 145 reaches '256', the initialized sub-area determination circuit 142 detects the completion of initialization on the prescribed sub-area, whereby the value set to the corresponding bit position of the register 145 is returned from '1' to '0'. Then, the initialized sub-area determination circuit 142 proceeds to determination of the next sub-area that should be initialized on the basis of the data stored in the register 141, so that it outputs the number representing the next initialized sub-area to the address conversion circuit 143. In this case, it outputs '1' representing the sub-area #1 to the address conversion circuit 143.

Since each sub-area consists of 256 words and all sub-areas are divided consecutively, the address conversion circuit 143 converts the sub-area number, which is output from the initialized sub-area determination circuit 142, into a top address (i.e., a relative address) EA of the designated sub-area, which is then supplied to the adder 144. For example, when the initialized sub-area determination circuit 142 outputs '0', the top address EA is set to '0' with regard to sub-area #0; when it outputs '1', the top address EA is set to '256' with regard to sub-area #1; and when it outputs '10', the top address EA is set to '2560' with regard to sub-area #10.

The counter 145 is capable of handling 256 increments in counting and is cleared in counting at the initialization start timing. Then, every time the access decision circuit 148 produces a non-access signal AN representing non-accessing, the counter 145 repeatedly performs up-counting. When the count value reaches '256', the counter 145 is cleared so that the count value is automatically returned to '0'.

The AC update detection circuit 146 detects an event in which the address counter 132 is updated, thus outputting '1'. The AND gate unit 147 comprises a plurality of gates in correspondence with the number of bits of the output data of the counter 145, wherein each gate receives each bit of the output data of the counter 145. The AND gate unit 147 is normally closed in response to '0' output from the AC update detection circuit 146, so that they directly transmit the output of the counter 145 to the adder 144. In an event in which the address counter 132 is updated in counting, the output of the AC update detection circuit 146 turns to '1', and the AND gate unit 147 outputs '0'.

The adder 144 adds together the count value of the address counter 132, the top address EA regarding the sub-area subjected to initialization, and the output of the AND gate unit 147 (which normally corresponds to the output of the counter 145), thus producing address data AD designating an address subjected to initialization. The address data AD are supplied to an address terminal of the working RAM 126 via a selector 133. The access decision circuit 148 normally checks the relative address SA, which is output from the program RAM 122 with regard to the working RAM 126, at the timing defined by the clock pulse signal CLK2. When the program RAM 122 does not output the relative address SA, in other words, when the program of the program RAM 122 does not need to access the working RAM 126, the access decision circuit 148 outputs the non-access signal AN.

Next, the overall operation of the musical tone signal generation circuit G having the aforementioned constitution shown in FIG. 8 will be described in detail.

Suppose that in the initial state, the program RAM 122 stores the effect program in the area ranging from address 0 to address 150, and it also stores the three-dimensional sound effect program in the area ranging from address 151 to address 767. In addition, the coefficient RAM 125 stores coefficients used for the effect program in the area ranging from address 0 to address 150, and it also stores coefficients used for the three-dimensional sound effect program in the area ranging from address 151 to address 767.

When the CPU 101 outputs an incoming call melody generation instruction to the sound source circuit 113, the sound source circuit 113 generates digital musical tone signals regarding the incoming call melody (i.e., PCM data), which are supplied to the digital signal processor 100. The PCM data are temporarily stored in the data RAM 121, while the program counter 128 simultaneously starting up-counting in response to the clock pulse signal CLK2. When the program counter 128 starts up-counting on the clock pulse signal CLK2, the prescribed program is read from the program RAM 122 so that the corresponding steps are sequentially transferred to the data RAM 121 and the operation circuit 123, while the relative addresses SA for accessing the working RAM 126 included in the steps of the program are added together with the output (i.e., absolute address) of the address counter 132 in the adder 131, so that the addition result is supplied to the address terminal of the working RAM 126 so as to designate the 'accessed' absolute address. At the same time, coefficients are correspondingly read from the coefficient RAM 125 in response to the count value of the program counter 128, so that they are supplied to the operation circuit 123.

The operation circuit 123 performs calculations using coefficients on PCM data output from the data RAM 121 in accordance with the program. At this time, the operation circuit 123 temporarily writes the output data thereof (or calculation interrupted data thereof) in the working RAM 126; then, it performs calculations again by use of the temporarily stored data. The operation result of the operation circuit 123 is once written into the buffer memory 124 and is then supplied to the DAC 115 via the buffer memory 124 at the timing defined by the clock pulse signal CLK1. The DAC 115 converts the data into analog signals, which are then supplied to the speaker 116.

Next, the operation for initializing sub-areas of the working RAM 126 will be described with reference to FIG. 11 and FIG. 12.

First, the CPU 101 writes data representing sub-areas subjected to initialization into the register 141, then, it clears the counter 145. Once the counter 145 is cleared, initialization is performed on the sub-area at the timing at which the program does not need to access the working RAM 126.

Suppose that the CPU 101 writes data into the register 141 so as to instruct initialization on sub-area #0, sub-area #1, sub-area #20, and sub-area #30. In this case, the initialized sub-area determination circuit 142 outputs '0' representing the sub-area #0 to the address conversion circuit 143, so that the address conversion circuit 143 produces the top address EA (i.e., relative address) set to '0', which is supplied to the adder 144. In addition, the counter 145 outputs '0', which is transmitted to the adder 144 via the AND gate unit 147. As a result, the adder 144 performs addition as follows:

$$AD=AC+0+0$$

(where 'AC' designates the output of the address counter 132)

Thus, the adder 144 produces address data AD, which is supplied to the selector 133. In this case, the address counter 132 presently designates absolute address #1003 in the working RAM 126.

When the access decision circuit 148 outputs a non-access signal AN at the timing at which the program RAM 122 does not output the relative address SA, the selector 133 is switched over so that the address data AD is supplied to the address terminal of the working RAM 126. At the same time, the selector 127 is switched over so that '0' (used for initialization) is supplied to a data input terminal of the working RAM 126 and are written into relative address 0 of the sub-area #0, which is thus initialized, so that the absolute address #1003 of the working RAM 126 is subjected to initialization. Incidentally, 256 addresses counted from address 0 to address 255 are assigned to each sub-area as relative addresses regarding each sub-area. When the access decision circuit 148 outputs the non-access signal AN, the counter 145 performs up-counting so as to output '1', which is transmitted to the adder 144 via the AND gate unit 147.

Next, when the program counter 128 is incremented so that the next step of the program is read from the program RAM 122, the access decision circuit 148 outputs the non-access signal AN again so that the next address data AD (where AD=AC+0+1) is supplied to the address terminal of the working RAM 126 by way of the selector 133, while '0' (used for initialization) is supplied to the data input terminal of the working RAM 126 by way of the selector 127; thus, relative address 1 of sub-area #0 is initialized, so that absolute address #1004 of the working RAM 126 is subjected to initialization.

Similarly, relative address 2 of the sub-area #0 is initialized, so that absolute address #1005 of the working RAM 126 is subjected to initialization. In FIG. 11, the present timing shows this condition in which the initialization is completed on address 0, address 1, and address 2 of the sub-area #0, wherein black-circle marks show initialization-completed addresses. At this timing, the address counter 132 is updated so that the absolute address (AC) is renewed by one address (that is, addressing proceed back from absolute address #1003 to absolute address #1002) so that the next absolute address subjected to initialization is shifted and renewed by one address, which is shown in "1fs after-timing" in FIG. 11. At this time, the counter outputs '3' while the address counter update detection circuit 146 outputs '1', so that the output of the AND gate unit 147 turns to '0', which is supplied to the adder 144. Thus, the adder 144 produces address data AD as follows:

$$AD=AC+0+0$$

When the access decision circuit 148 outputs the non-access signal AN again, relative address 0 of the sub-area #0 of the working RAM 126 is initialized again. FIG. 11 obviously shows that the relative address 0 is directed to the absolute address #1002 of the working RAM 126, and it differs from the absolute address #1003 (designated by the relative address 0 before the address counter 132 is updated), so that it is an un-initialized address. When the initialization is performed, the counter 145 outputs '4', and the output of the AC update detection circuit 146 returns to '0'. As a result, the AND gate unit 147 outputs '4' to the adder 144, which in turn produces address data AD as follows:

$$AD=AC+0+4$$

When the access decision circuit 148 outputs the non-access signal AN again, address 4 of the sub-area #0 is initialized so that absolute address #1006 of the working RAM 126 is subjected to initialization. Then, the same process is repeated. When the address counter 132 is updated again at the timing at which relative address 253 of the sub-area #0 is initialized, the AC update detection circuit 146 outputs '1' representing the updating of the address counter 132, so that the AND gate unit 147 outputs '0'. Thus, the relative address 0 of the sub-area #0 is initialized again so that absolute address #1001 of the working RAM 126 is subjected to initialization. This is shown in "2fs after-timing" in FIG. 11. Thereafter, relative address 255 of the sub-area #0 is initialized so that absolute address #1255 of the working RAM 126 is subjected to initialization, thus completing the initialization on the sub-area #0.

When the count value of the counter 145 reaches '256' (indicating the completion of the initialization of the sub-area #0), the initialized sub-area determination circuit 142 detects this event so that the bit designating the sub-area #0 in the register 141 is cleared; then, the initialized sub-area determination circuit 142 proceeds to determination of the next sub-area subjected to initialization. In this case, when it determines the sub-area #1 as the next initialized sub-area, it outputs '1' representing the sub-area #1 to the address conversion circuit 143. Upon the receipt of '1', the address conversion circuit 143 outputs the top address EA '256' (i.e., relative address) of the sub-area #1 to the adder 144. The counter 145 is cleared after counting '256'. Thereafter, as similar to the sub-area #0, relative addresses of the sub-area #1 are sequentially initialized one by one so that the overall area of the sub-area #1 is completely initialized.

As described above, when the address counter 132 is updated, relative address 0 of the 'updated' sub-area is initialized first; then, the initialization proceeds in accordance with the output of the counter 145. This is because when the initialization directly proceeds in accordance with the output of the counter 145 which is updated, relative address 0 of the sub-area must remain un-initialized.

Figure 12:
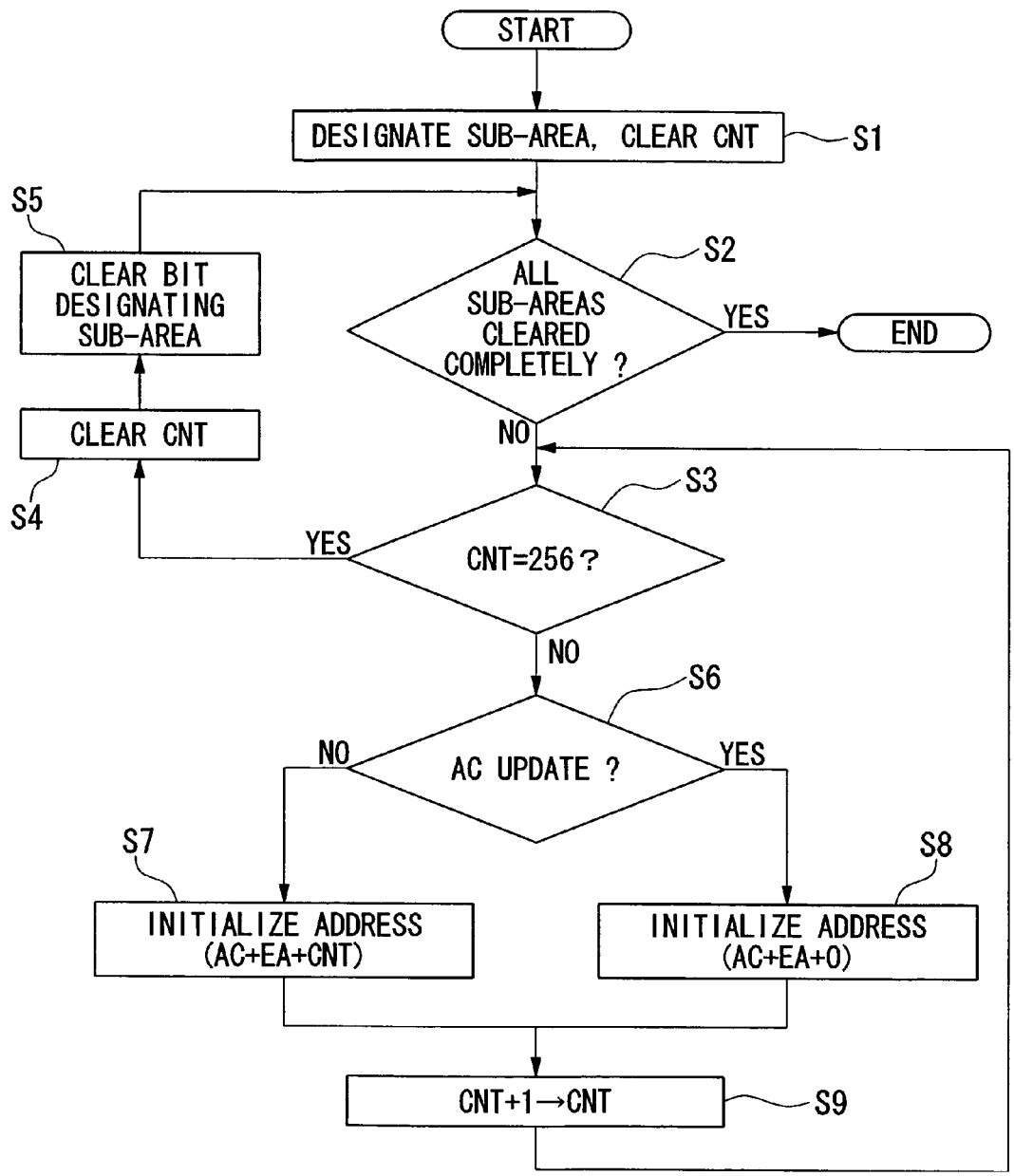
FIG. 12 is a flowchart showing the details of the initialization process.

FIG. 12 is a flowchart showing an initialization process, the overall content of which is described above.

In step S1, the initialization circuit 140 designates a sub-area subjected to initialization, and the register 141 is cleared. Then, the flow proceeds to step S7 via steps S2, S3, and S6, wherein an absolute address (AC+EA+CNT) for the designated sub-area is initialized. Herein, 'CNT' represents the count value of the counter 145. Then, the flow proceeds to step S9 in which the counter 145 is incremented. After completion of the step S9, the flow returns to step S7 again via steps S3 and S6, wherein the sub-area is subjected to initialization.

The aforementioned steps S3, S6, S7, and S9 are repeatedly performed. When the address counter 132 is updated, the decision result of the step S6 turns to "YES" so that the flow proceeds to step S8 in which the relative address 0 of the sub-area is subjected to initialization. Thereafter, a series of steps S9, S3, S6, and S7 are repeatedly performed. When the count value of the counter 145 reaches '256', the decision result of the step S3 turns to "YES" so that the flow proceeds to step S4 in which the counter 145 is cleared. Then, in step S5, a prescribed bit of data that are stored in the register 141 to designate the aforementioned sub-area is cleared. Thereafter, the flow proceeds to step S2 in which a decision is made as to whether or not all of sub-areas, which are designated by the data of the register 141 and should be subjected to initialization, are completely initialized. When the decision result is "NO", the aforementioned series of steps starting from the step S3 are repeatedly performed. When the decision result of the step S2 turns to "YES", the initialization circuit 140 ends the initialization process thereof.

3. Third Embodiment

Next, a third embodiment of the invention will be described in detail.

The second embodiment may have a minor technical problem in which when the output of the address counter 132 changes in the middle of the initialization of the sub-area #1 after the initialization is completed on the sub-area #0, the relative address 0 of the sub-area #1 is initialized but the relative address 0 of the sub-area #0 remains uninitialized. The third embodiment is designed to solve the aforementioned problem of the second embodiment.

Figure 13:
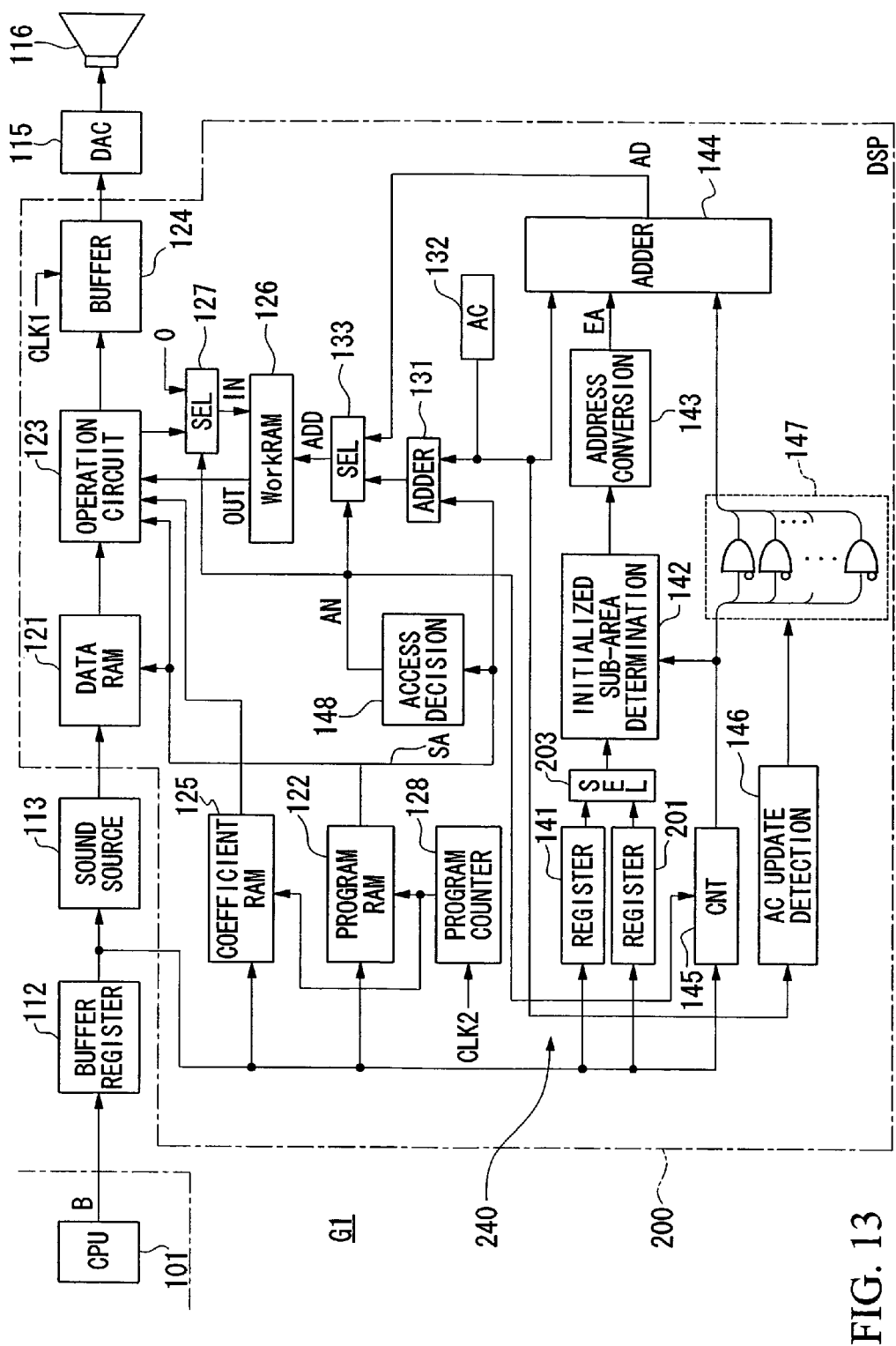
FIG. 13 is a block diagram showing the constitution of a musical tone signal generation circuit including a digital signal processor in accordance with a third embodiment of the invention.

FIG. 13 is a block diagram showing a musical tone signal generation circuit G1 incorporating a digital signal processor 200 in accordance with a third embodiment of the invention, wherein parts identical to those shown in FIG. 8 are designated by the same reference numerals; hence, the description thereof will be omitted. The musical tone signal generation circuit G1 of FIG. 13 differs from the musical tone signal generation circuit G of FIG. 8 in the constitution of an initialization circuit 240. Compared with the initialization circuit 140 shown in FIG. 8, the initialization circuit 240 shown in FIG. 13 additionally incorporates a register 201 whose constitution is identical to that of the register 141 and a selector 203 that selectively outputs either the output of the register 141 or the output of the register 201 to the initialized sub-area determination circuit 142.

Next, the initialization process for the working RAM 126 in the third embodiment will be described with reference to FIG. 14.

Figure 14:
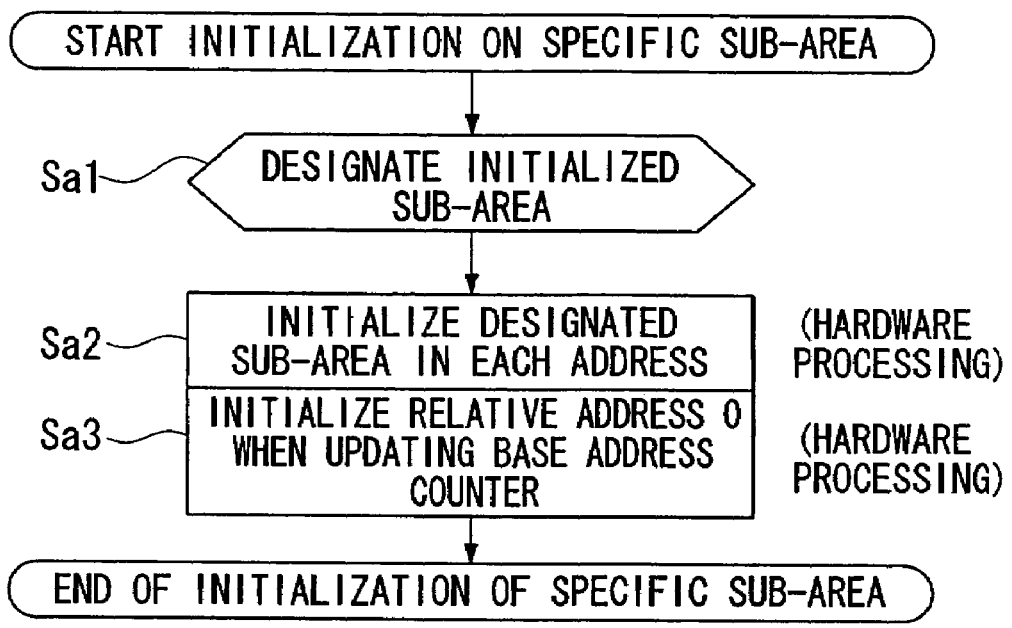
FIG. 14 is a flowchart showing an initialization process performed by an initialization circuit shown in FIG. 13.

FIG. 14 is a flowchart showing the initialization process that is performed on the working RAM 126 by the initialization circuit 240. In step Sa1, the CPU 101 writes data designating sub-areas subjected to initialization into the register 141 and the register 201. In step Sa2, the initialization circuit 240 performs the initialization on the designated sub-area sequentially with respect to each of addresses. When the initialization is completed on one sub-area, the prescribed bit (originally set to '1') designating the initialized sub-area within the data of the register 141 is cleared, whereas the corresponding bit (set to '1') of the data of the register 201 is not cleared. When the address counter 132 is updated, the initialization circuit 240 detects the sub-area being presently subjected to initialization on the basis of the data of the register 201, so that relative address 0 of each sub-area is initialized in step Sa3.

Figure 15:
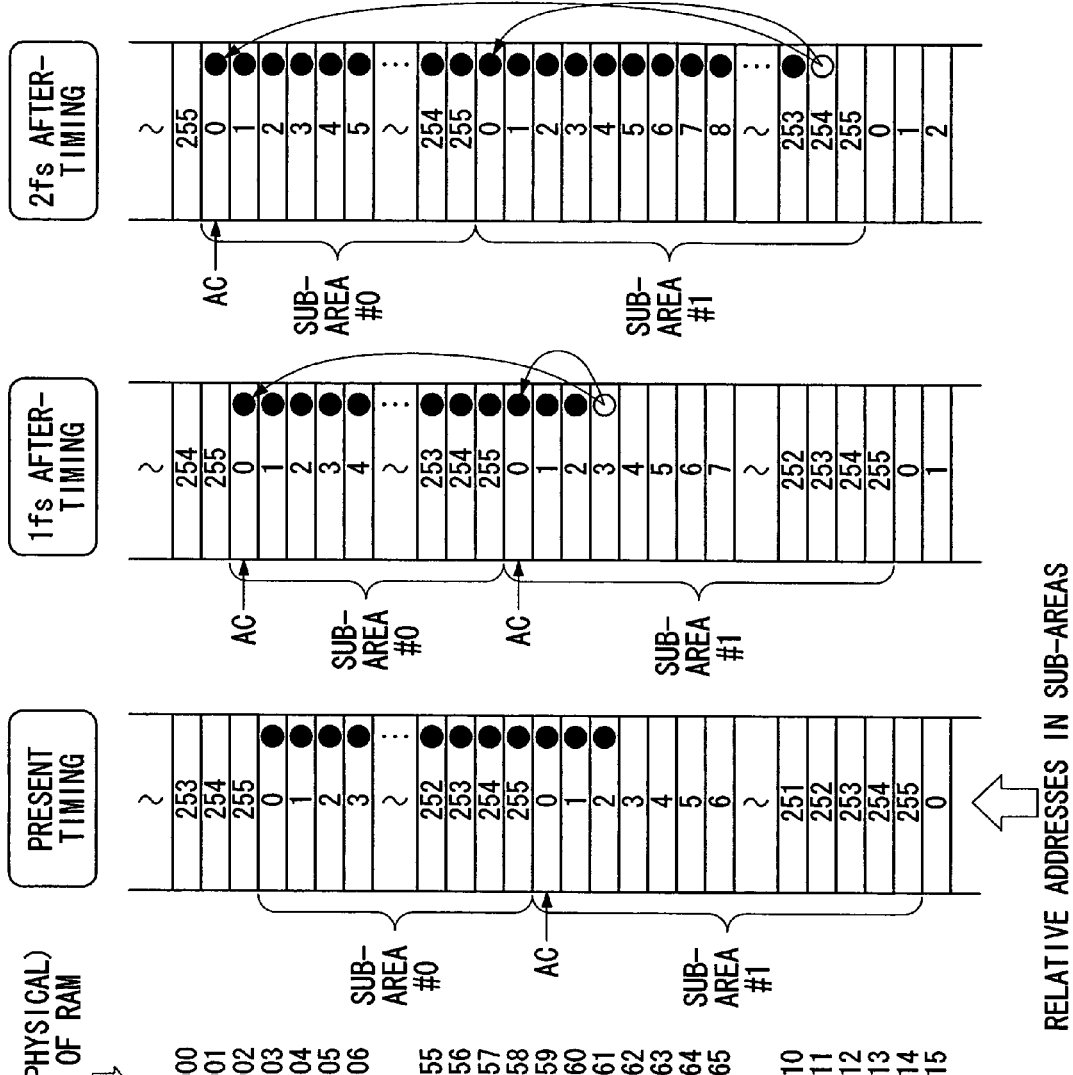
FIG. 15 diagrammatically shows time-related variations of relative addresses in relation to absolute addresses of a working RAM so as to explain the initialization process.

The aforementioned initialization process will be described in detail with reference to FIG. 15.

In order to initialize the sub-areas #0 and #1, for example, the CPU 101 writes 32-bit data instructing initialization on the sub-areas #0 and #1 into the registers 141 and 201 respectively; then, the counter 145 is cleared. At this time, the AC update detection circuit 146 outputs '0' to the selector 203, which in turn selectively outputs the data of the register 141 to the initialized sub-area determination circuit 142.

Similar to the second embodiment, the third embodiment proceeds to initialization on the sub-area #0, in which bits are sequentially initialized. After the completion of the initialization of the sub-area #0, the prescribed bit (originally set to '1') designating the sub-area #0 within the data of the register 141 is cleared, whereas the corresponding bit of the data of the register 201 (originally set to '1' designating the sub-area #0) is not cleared. Then, the initialization proceeds up to relative address 2 of the sub-area #1 (see black circles in FIG. 15 regarding the present timing). At this timing, the address counter 132 is updated so that the AC update detection circuit 146 outputs '1', whereby the AND gate unit 147 outputs '0' to the adder 144. In addition, the data of the register 201 is selectively supplied to the initialized sub-area determination circuit 142 via the selector 203 that is switched over in response to '1' output from the AC update detection circuit 146.

The initialized sub-area determination circuit 142 detects the sub-areas subjected to initialization on the basis of the data of the register 201, whereby it sequentially outputs '0' and '1' representing the 'initialized' sub-areas #0 and #1. When the initialized sub-area determination circuit 142 outputs '0', the address conversion circuit 143 correspondingly outputs '0' as the top address EA representing the top address of the sub-area #0, whereby the adder 144 performs a calculation of "AC+0+0" so as to produce address data AD. At the next timing at which the access decision circuit 148 outputs the non-access signal AN again, the relative address 0 of the sub-area #0 of the working RAM 126 is initialized. Thereafter, when the initialized sub-area determination circuit 142 outputs '1', the address conversion circuit 143 correspondingly outputs '256' as the top address EA representing the top address of the sub-area #1. Thus, the adder 144 performs a calculation of "AC+256+0" so as to produce address data AD. At the next timing at which the access decision circuit 148 outputs the non-access signal AN again, the relative address 0 of the sub-area #1 of the working RAM 126 is initialized. This is shown in "1fs after-timing" in FIG. 15.

When the address counter 132 is updated at the timing at which the initialization proceeds up to relative address 2 of the sub-area #1, the initialization does not proceed to the next address 3, but the initialization is performed sequentially on relative address 0 of the sub-area #0 and relative address 0 of the sub-area #1. During this initialization, a gate circuit (not shown) stops the counter 145 performing up-counting with respect to the non-access signal AN. At the completion of the initialization, the counter 145 is incremented again, and the output of the AC update detection circuit 146 is returned to '0'. Thereafter, the initialization is performed sequentially on the subsequent addresses (starting from relative address 4) of the sub-area #1. Incidentally, the aforementioned address 3 of the sub-area #1 corresponds to absolute address #1261 at the 1fs after-timing shown in FIG. 15, wherein it has been already initialized just after the address counter 132 is updated.

When the address counter 132 is updated after the completion of the initialization on relative address 253 of the sub-area #1, the initialization is performed sequentially on relative address 0 of the sub-area #0 and relative address 0 of the sub-area #1 at the timing at which relative address 254 of the sub-area #1 is subjected to initialization; then, the initialization is performed on the subsequent addresses (starting from relative address 255) of the sub-area #1.

Lastly, the digital signal processor of this invention can be adapted to any types of musical tone signal generation circuits incorporated into portable terminal devices such as cellular phones.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A digital signal processor comprising:
    a data storage for temporarily storing audio data sampled at a first frequency, wherein the data storage is divided into a plurality of sub-areas that are respectively designated by addresses in access operations on the data storage;
    a program memory for storing a program including a plurality of instructions, at least one of the plurality of instructions including an address required for accessing the data storage;
    a program counter, responsive to a program counter clock having a second frequency, for sequentially providing addresses to the program memory to sequentially address the plurality of instructions in the program memory at a rate defined by the program counter clock, the second frequency being a multiple of the first frequency;

an operation circuit for performing calculations on the audio data that are read from the data storage, in accordance with the addressed instructions of the program memory;

a write circuit; and a non-access detector coupled to the program memory for making a determination as to whether the addressed instruction includes an address required for accessing the data storage, and upon determining that the addressed instruction does not include an address required for accessing the data storage, providing a non-access signal to the write circuit to cause the write circuit to compulsorily write a logic "0" into one of the plurality of sub-areas, the non-access detector making the determination upon the occurrence of each program counter clock.

2. A digital signal processor according to claim 1 including:

a register for storing data designating prescribed sub-areas of the data storage to be subjected to initialization; and an address generator for generating address data designating addresses of the prescribed sub-areas of the data storage to be subjected to initialization.

3. A digital signal processor according to claim 2, wherein the address generator includes a top address generator for generating a top address for a prescribed sub-area based on the data stored in the register, and a counter for incrementing a count value thereof every time the non-access detector provides the non-access signal, whereby the address data are generated based on the top address and the count value.

4. A digital signal processor according to claim 3 including a second register for storing the same data as the first register, wherein upon completion of initialization of one of the prescribed sub-areas, the data of the first register is cleared and data of the second register is utilized to designate the prescribed sub-areas of the data storage to be subjected to initialization.

5. A digital signal processor according to claim 1, wherein a number of instructions stored in the program memory is N, and the second frequency is equal to N times the first frequency.

6. A digital signal processor comprising:

a data storage for temporarily storing audio data sampled at a first frequency, wherein the data storage is divided into a plurality of sub-areas that are respectively designated by addresses in access operations on the data storage, wherein each sub-area has a plurality of words that are respectively designated by addresses in access operations on the data storage;

a program memory for storing a program including a plurality of instructions, at least one of the plurality of instructions including a relative address required for accessing the data storage;

a program counter, responsive to a program counter clock having a second frequency, for sequentially providing addresses to the program memory to sequentially address the plurality of instructions in the program memory at a rate defined by the program counter clock, the second frequency being a multiple of the first frequency;

an operation circuit for performing calculations on the audio data that are read from the data storage, in accordance with the addressed instructions of the program memory;

a non-access detector coupled to the program memory for making a determination as to whether the addressed instruction includes a relative address required for accessing the data storage, and upon determining that the addressed instruction does not include a relative address required for accessing the data storage, providing a non-access signal, the non-access detector making the determination upon the occurrence of each program counter clock;

a first counter that designates a specific absolute address, wherein the first counter updates the designated specific absolute address every time one period of a sampling cycle, corresponding to the first frequency, elapses;

a second counter that counts up a value every time the non-access detector provides a non-access signal; and, a circuit that specifies an address in the data storage based on at least the specific absolute address designated by the first counter and the value counted by the second counter, and compulsorily writes a logic "0" into a word corresponding to the specified address in one of the plurality of sub-areas.

7. A digital signal processor according to claim 6, wherein each sub-area has a number of words that are respectively designated by addresses, and the second counter is capable of counting up to the number of words.

8. A digital signal processor according to claim 6 including:

a first register for storing data designating prescribed sub-areas of the data storage to be subjected to initialization; and a second register for storing the same data as the first register, wherein the data of the second register is cleared and data of the second register is utilized to designate the prescribed sub-areas of the data storage to be subjected to initialization when the first counter updates the designated specific absolute address.

* * * * *